E. N. BANKS.
TRACE-FASTENER.

No. 182,792.  Patented Oct. 3, 1876.

WITNESSES:
E. Wolff
John Goethals

INVENTOR:
E. N. Banks
BY Munn & Co
ATTORNEYS.

UNITED STATES PATENT OFFICE.

EPHRAIM N. BANKS, OF WILKESBARRE, PENNSYLVANIA.

IMPROVEMENT IN TRACE-FASTENERS.

Specification forming part of Letters Patent No. 182,792, dated October 3, 1876; application filed August 14, 1876.

*To all whom it may concern:*

Figure 1:
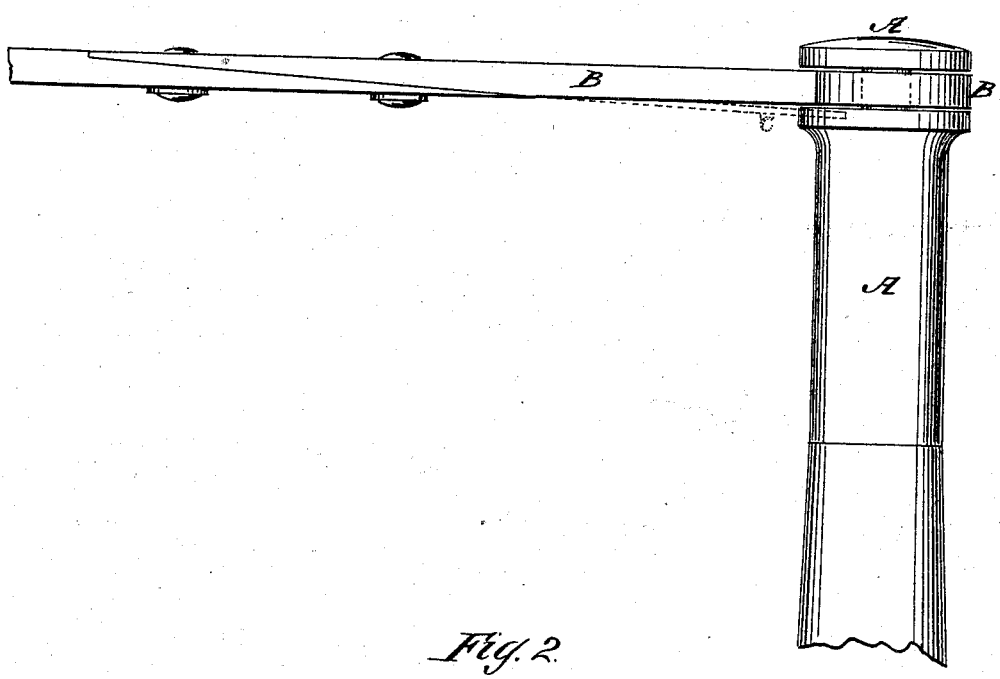
Figure 2:
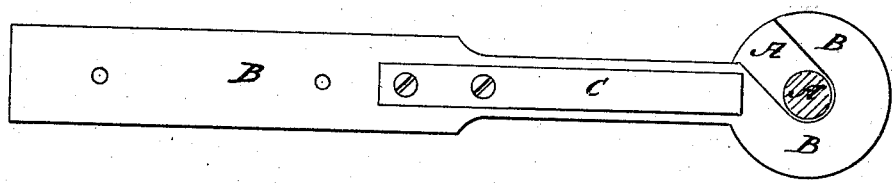
Figure 3:
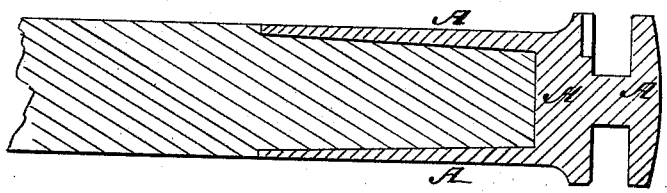

Be it known that I, EPHRAIM NELSON BANKS, of Wilkesbarre, in the county of Luzerne and State of Pennsylvania, have invented a new and useful Improvement in Tug-Fasteners, of which the following is a specification:

Figure 1 is a top view of my improved fastener. Fig. 2 is a side view of the same, partly in section through the neck of the socket. Fig. 3 is a detail longitudinal section of the socket.

Similar letters of reference indicate corresponding parts.

The object of this invention is to furnish an improved fastener or coupling for connecting tugs to whiffletrees, which shall be simple in construction, easily connected and disconnected, and at the same time strong, durable, safe, and noiseless.

The invention consists in an improved tug-fastening, formed by the combination, with each other, of the socket having a deep ring-groove formed around its outer end, and a notch formed in it at the side of said groove, the hook made with a circular head, and its cavity in the form of an inclined slot, and the spring, as hereinafter fully described.

A is the socket, which is fitted upon and secured to the end of the whiffletree. Around the outer end of the socket A is formed a deep ring-groove, forming a neck. B is a hook, the head of which is made in the form of a circle, and of such a size and thickness as to fit into the groove of the socket A in such a way that its outer surface may be flush with the outer surface of the said socket, as shown in Figs. 1 and 2. The cavity of the hook B is made in the form of an inclined slot, extending in to the center of the head from the base of the shank of said hook, and of such a size as to receive and fit upon the neck of the socket A. The shank of the hook B may be placed upon the side of or within the end of the tug, and is secured to said tug by rivets. To the side of the shank of the hook B is secured the end of a spring, C, the free end of which enters a notch or recess in the socket A at the side of its groove, as shown in Fig. 3.

By this construction the hook B can only be attached and detached by pressing the free end of the spring C close against the side of the said hook B, and when attached is not liable to become detached accidentally, making it a safe and convenient fastening.

Having thus described my invention, I claim as new and desire to secure by Letters Patent—

The combination of ring-grooved socket A, having side notch, and hook B, having a spring, C, attached to the side of its neck, as shown and described, to form a tug-fastener.

EPHRAIM NELSON BANKS.

Witnesses:
S. HENRIE HIBLER,
JOHN FLANIGAN.